United States Patent [19]
Okamoto

[11] Patent Number: 5,965,288
[45] Date of Patent: Oct. 12, 1999

[54] GAS HUMIDIFYING DEVICE FOR USE WITH A FUEL CELL

[75] Inventor: Takafumi Okamoto, Koshigaya, Japan

[73] Assignee: Honda Giken Kogyo Kabushiki Kaisha, Tokyo, Japan

[21] Appl. No.: 08/919,922

[22] Filed: Aug. 28, 1997

[30] Foreign Application Priority Data

Sep. 2, 1996 [JP] Japan .................................. 8-232217

[51] Int. Cl.$^6$ ................................................ H01M 8/04
[52] U.S. Cl. ............................ 429/26; 429/20; 429/22; 429/24; 429/25; 429/34
[58] Field of Search ............................ 429/20, 22, 24, 429/25, 26, 34

[56] References Cited

U.S. PATENT DOCUMENTS

| | | | |
|---|---|---|---|
| 4,973,530 | 11/1990 | Vanderborgh et al. | 429/13 |
| 5,200,278 | 4/1993 | Watkins et al. | 429/24 |
| 5,798,186 | 8/1998 | Fletcher et al. | 429/26 |

OTHER PUBLICATIONS

European Search Report Communication (Jan. 12, 1998).
Patent Abstract of JP 08064218 (Aug. 3, 1996).
Patent Abstract of JP 08185877 (Jul. 16, 1996).
Patent Abstract of JP 07135012 (May 23, 1995).
Patent Abstract of JP 07226222 (Aug. 22, 1995).
Patent Abstract of JP 09007622 (Oct. 1, 1997).
Patent Abstract of JP 06132038 (May 5, 1994).
Patent Abstract of JP 07326376 (Dec. 12, 1995).

*Primary Examiner*—Bruce F. Bell
*Attorney, Agent, or Firm*—Lyon & Lyon LLP

[57] ABSTRACT

A gas humidifying device for use with a fuel cell in which water permeable membranes are provided with fuel gas passages and oxygen-containing gas passages formed on one side of the water permeable membranes, and wherein humidifying water passages are formed on the other side thereof. Medium supply passages are provided independently from, yet in proximity to the water passages, for supplying a medium having a melting point lower than that of water. Accordingly, a melting operation for melting the water in the interior of the humidifier can be easily and swiftly carried out, while the device remains simple in structure.

8 Claims, 6 Drawing Sheets

5,965,288

GAS HUMIDIFYING DEVICE FOR USE WITH A FUEL CELL

BACKGROUND OF THE INVENTION

1. Field of the Invention

The present invention is directed to a gas humidifying device for humidifying gases which are supplied to a fuel cell in which an anode electrode and a cathode electrode are disposed in facing relation to each other with an electrolyte membrane interposed therebetween.

2. Description of the Related Art

There have been developed fuel cells comprising, for example, a plurality of stacked fuel cell units each having an anode and a cathode provided in opposing relation with an ion exchange membrane sandwiched therebetween, the fuel cell units further being interposed between separators. Such fuel cells are being put to practical use in a variety of applications.

Such types of fuel cells, for example, are structured such that a hydrogen gas (i.e. a fuel gas) which is generated by methanol vapor reforming is supplied to an anode electrode, and an oxygen-containing gas (air) is supplied to a cathode electrode, whereby the hydrogen gas becomes ionized and flows through a solid polymer electrolyte membrane, thereby generating electrical energy out of the fuel cell.

In this case, in order that efficient generation of electrical power from the fuel cell can be exhibited, it is necessary to maintain the solid polymer electrolyte membrane in an optimal humidified state. For this purpose, it has been known to provide a humidifying device for humidifying in advance by water the fuel and oxygen-containing gases, and by constructing the humidifying device and fuel cell to be connected to each other, humidified fuel and oxygen-containing gases are supplied to the fuel cell unit.

However, with a humidifying device as described above, especially when used in regions having particularly cold climates, it is often the case that the water which is used for humidification tends to become frozen. Due to this problem, before initiating operation of the fuel cell, it is necessary to perform a melting operation on the water contained in the interior of the humidifying device, and such an operation is both troublesome and time consuming.

The present invention has the object of addressing and solving the aforementioned problems, wherein a melting operation for water inside a humidifying device can be easily and swiftly carried out, yet while offering a humidifying device for humidifying gases in a fuel cell having a simplified structure.

In order to address these problems, it is an object of the present invention to provide a humidifying device for humidifying gases in a fuel cell, in which a gas supply passage is formed on one side surface of a water permeable element, a humidifying water passage is formed on the other side surface of the water permeable element, and a medium flow passage is disposed in proximity to the humidifying water passage. In addition, the fuel and oxygen-containing gases are supplied to respective gas supply passages, whereas water is supplied to the humidifying water passage, and such water permeates the water permeable element, so that the gases in the gas supply passages are effectively humidified.

When water becomes frozen in the water supply passage, because a medium having a melting point lower than that of water is supplied to the medium flow path which is disposed in proximity to the humidifying water passage, heat exchange occurs between the water and the medium, and the water can be easily and reliably melted. Notwithstanding, not only is such a medium flow passage provided, but also the overall structure of the humidifying device can be effectively simplified.

For this purpose, a heating means is disposed in a circulatory route for circulating the medium to the medium supply passage. Accordingly, because the medium is heated by the heating means, a melting operation on the water can be even more swiftly and reliably accomplished.

Further, a first circulatory path for supplying the medium to a cooling passage in the interior of the fuel cell, and a second circulatory path for circulating the medium to the medium passage in the interior of the humidifying means are provided, wherein when water becomes frozen inside the humidifying means, the medium is supplied to the second circulatory path via a switching valve means. As a result, the structure of the humidifying means is simplified.

The above and other objects, features and advantages of the present invention will become more apparent from the following description when taken in conjunction with the accompanying drawings in which preferred embodiments of the present invention are shown by way of illustrative examples.

DESCRIPTION OF THE PREFERRED EMBODIMENTS

Figure 1:
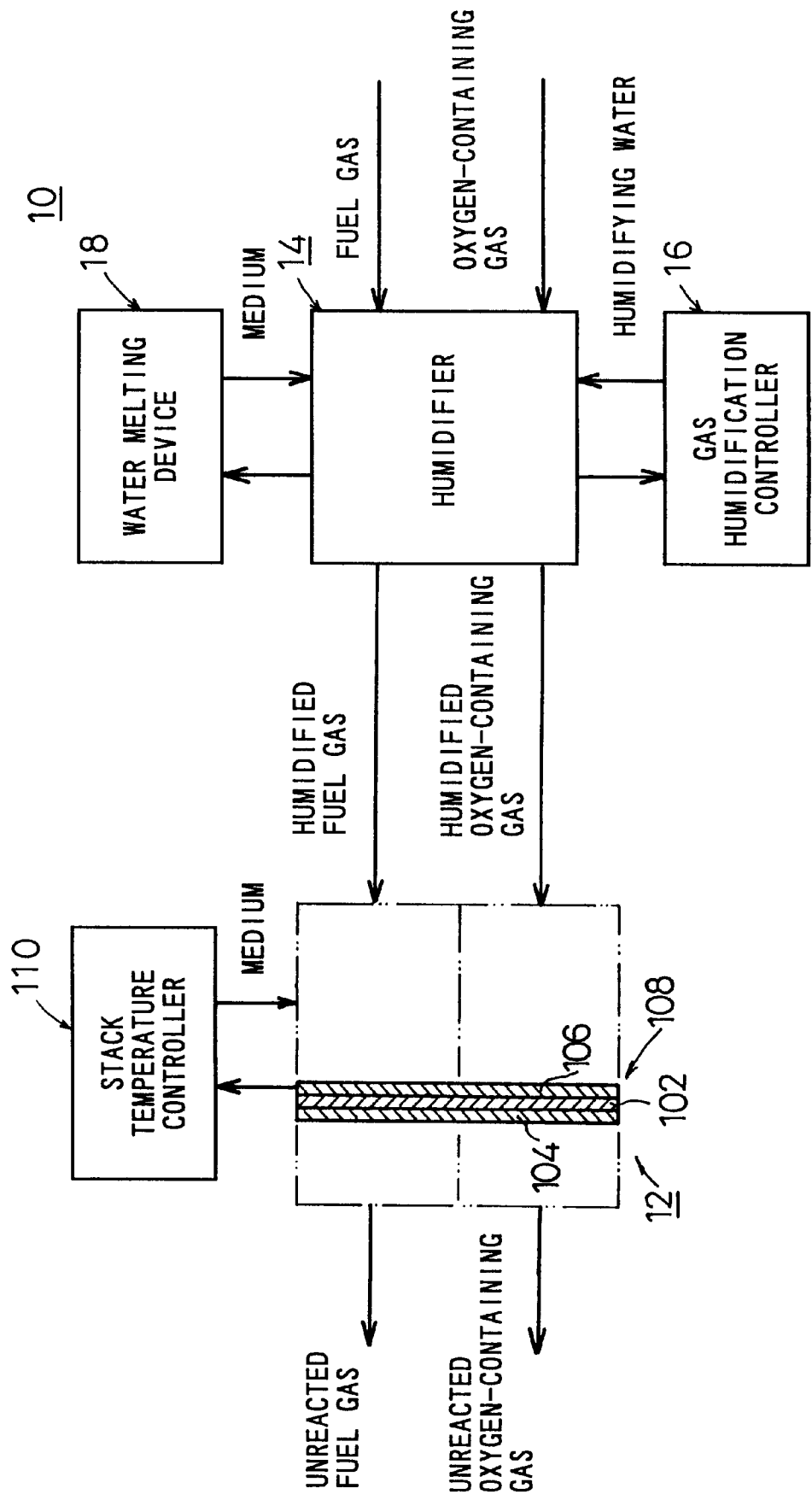
FIG. 1 is an outline structural diagrammatic view of the humidifying device and fuel cell according to a first embodiment of the present invention.

FIG. 1 is an outline structural diagrammatic view of the humidifying device 10 according to a first embodiment of the present invention, and the fuel cell 12 which is connected to the humidifying device. In the humidifying device 10, there are provided a humidifier 14, a gas humidification amount controller 16 for humidifying a fuel gas (hydrogen gas or a methanol reformed hydrogen gas) and an oxygen-containing gas (air or oxygen) which are supplied to the humidifier 14, and a water melting device 18 for melting water which has become frozen in the interior of the humidifier 14.

Figure 2:
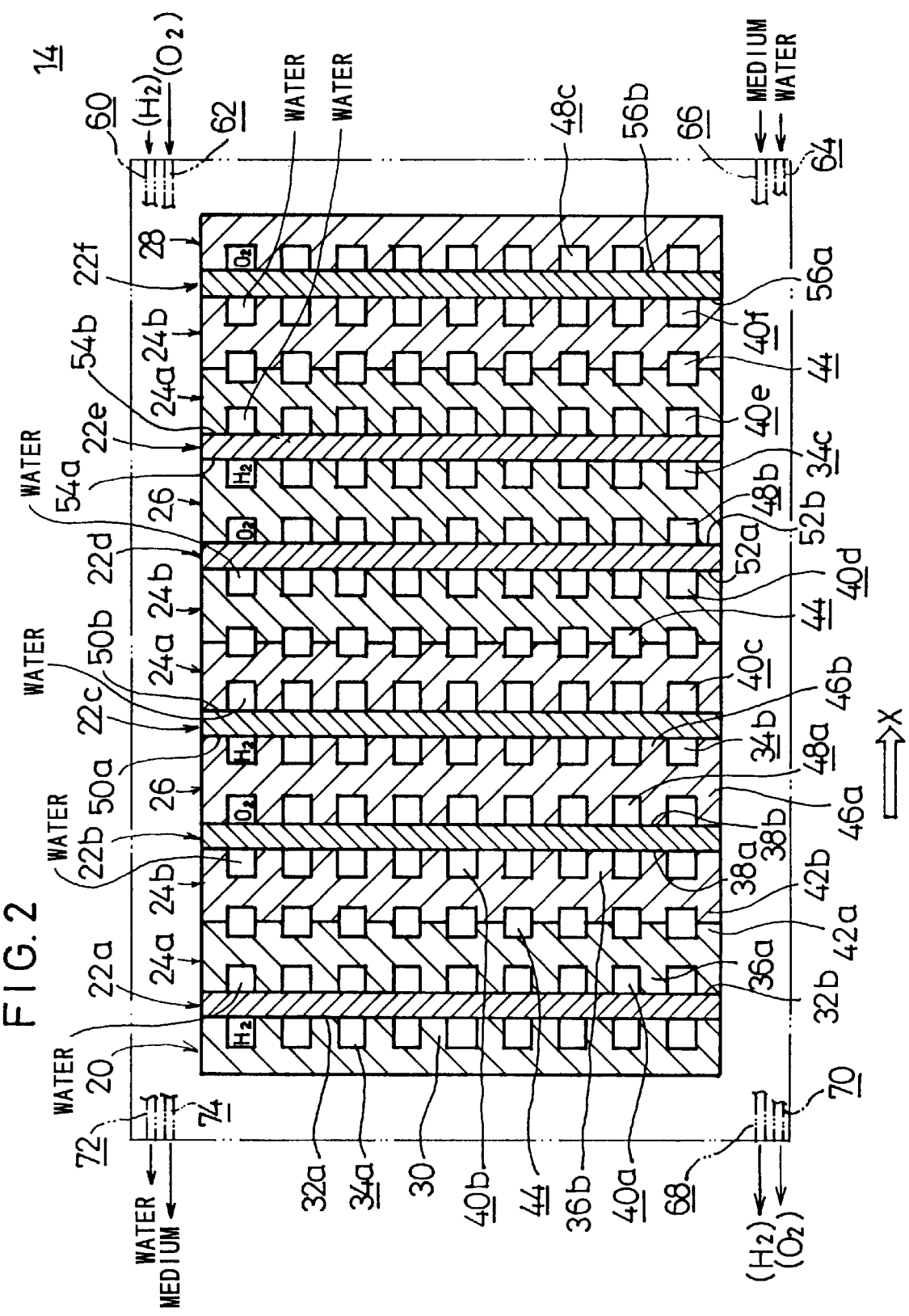
FIG. 2 is an explanatory view of the interior of a humidifier which makes up the humidifying device shown in FIG. 1.
Figure 3:
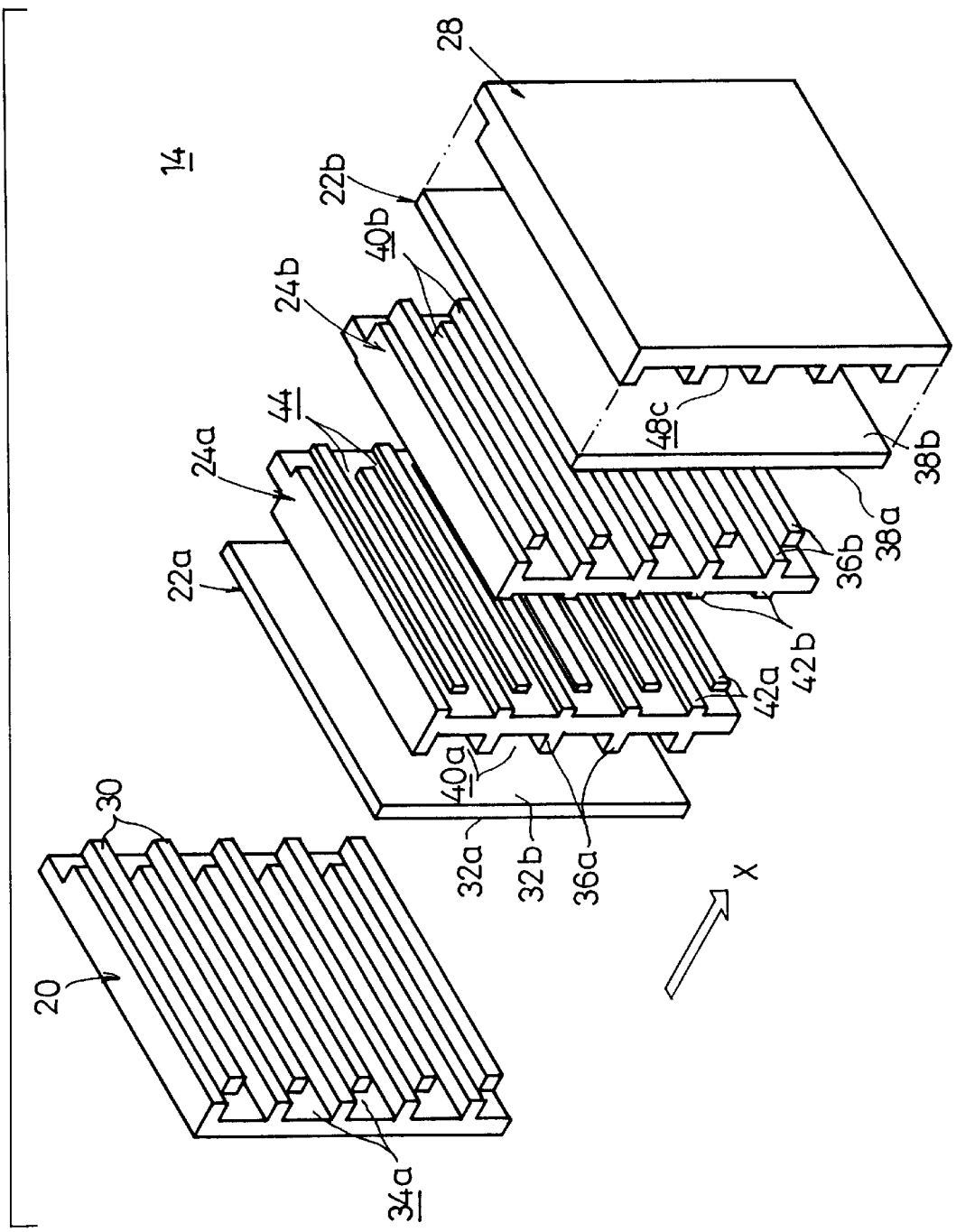
FIG. 3 is a partial perspective view of the humidifier.

In the humidifier 14 as shown in FIGS. 2 and 3, a first fuel gas supply plate 20, a first water permeable membrane (water permeable element) 22a, supply plates 24a, 24b for water and the medium, a second water permeable member 22b, a third supply plate 26 for the fuel gas and the oxygen containing gas, a third water permeable membrane 22c, further second supply plates 24a, 24b, a fourth water permeable membrane 22d, a further third supply plate 26, a fifth water permeable membrane 22e, further second supply plates 24a, 24b, a sixth water permeable membrane 22f, and a fourth supply plate 28 for the oxygen-containing gas are integrally arranged along the direction of the Arrow X shown in FIGS. 2 and 3.

The first supply plate 20 is flat on one surface thereof, and on the other side are disposed a plurality of projections 30 which extend in a horizontal direction, wherein due to this structure, perpendicularly directed serpentine fuel gas passages 34a are formed along one side surface 32a of the first water permeable membrane 22a.

On the second supply plates 24a, 24b, on respective side surfaces thereof, a plurality of projections 36a, 36b are disposed which extend horizontally therealong, wherein due to this structure, on the other side surface 32b of the first water permeable membrane 22a, and on one side surface 38a of the second water permeable membrane 22b, perpendicularly directed serpentine humidifying water passages 40a, 40b are formed. On surfaces of the second supply plates 24a, 24b which mutually face each other, a plurality of relatively short length projections 42a, 42b are formed extending horizontally therealong, wherein both of such projections 42a, 42b abut each other, thereby forming a medium flow passage 44.

As shown in FIG. 2, the third supply plate 26 has a plurality of projections 46a, 46b which extend horizontally along both surfaces thereof. An oxygen-containing gas passage 48a is formed between the projections 46a and the other side surface 38b of the second water permeable membrane 22b. Similarly, a fuel gas passage 34b is formed between the projections 46b and one side surface 50a of the water permeable membrane 22c. A water passage 40c is formed between the third water permeable membrane 22c and the other side surface 50b of the second supply plate 24a.

Between the surface 52a of the fourth water permeable membrane 22d and the second supply plate 24b, as well as between the surface 52b of the fourth water permeable membrane 22d and the third supply plate 26, a water passage 40d and an oxygen containing gas passage 48b are formed. Both side surfaces 54a, 54b of the fifth water permeable membrane make up parts of a fuel gas passage 34c and a water passage 40e, and both side surfaces 56a, 56b of the sixth water permeable membrane 22f make up parts of respective water passages 40f and an oxygen containing gas passage 48c.

In the humidifier 14, there are disposed a fuel gas introduction port 60 for introducing a fuel gas into the fuel gas passages 34a–34c, an oxygen containing gas introduction port 62 for introducing an oxygen containing gas into the oxygen containing gas passages 48a–48c, a water introduction port 64 for introducing humidifying water into the water passages 40a–40f, a medium introduction port 66 for introducing a medium into the medium passage 44, a fuel gas discharge port 68 for discharging and conveying a post-humidified fuel gas to the fuel cell 12, an oxygen containing gas discharge port 70 for discharging and conveying a post-humidified oxygen containing gas to the fuel cell 12, a water discharge port 72 for discharging any unused water, and a medium discharge port 74 for discharging the medium after the melting processing has been performed.

Figure 4:
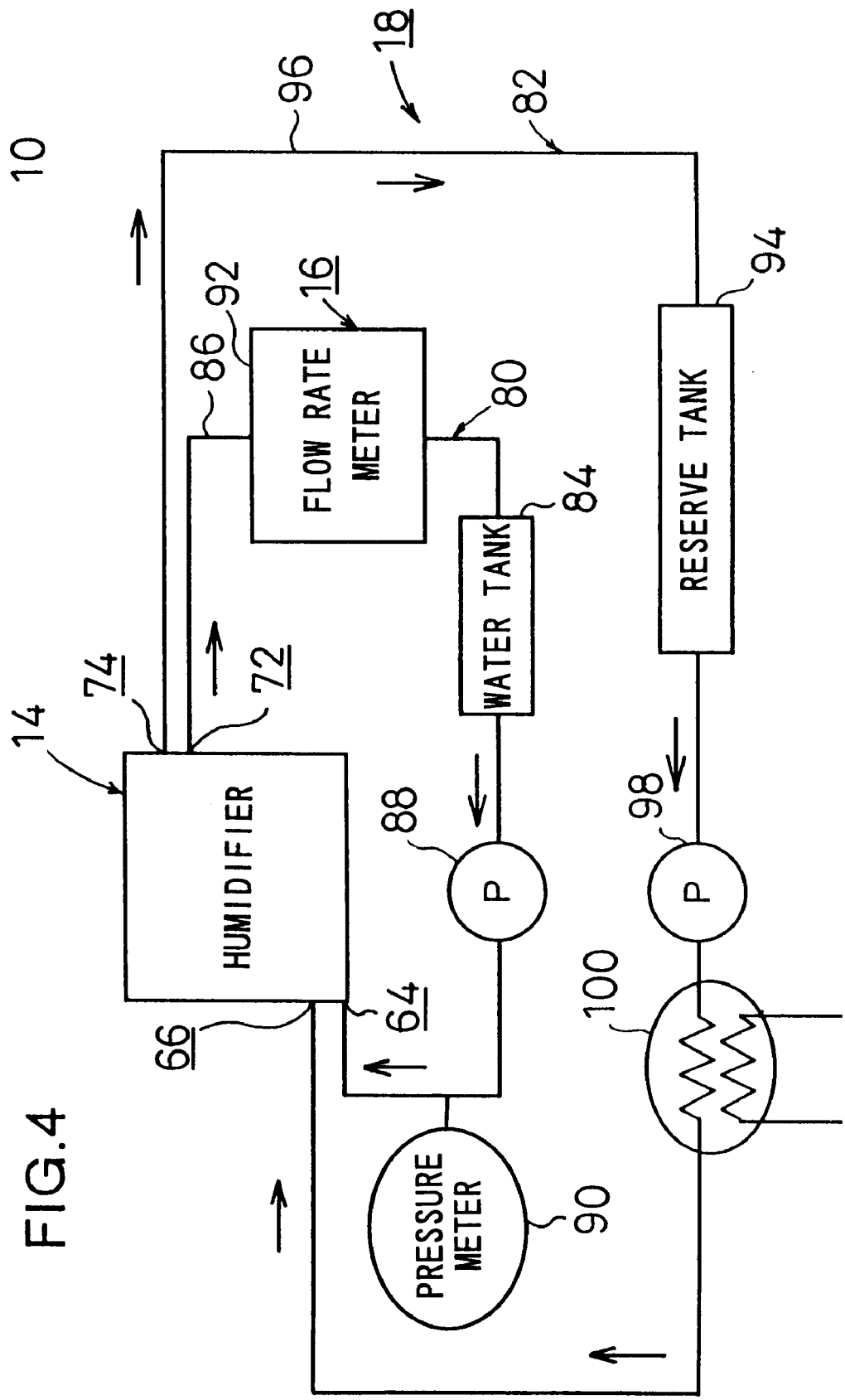
FIG. 4 is an outline diagrammatic view of the water melting device and gas humidity controller which make up the humidifying device of the present invention.

As shown in FIG. 4, a first circulatory route 80 is provided in the gas humidifying controller 16, inter-communicating the water introduction port 64 and the water discharge port 72, and circulating water inside the humidifier 14. The first circulatory route 80 includes therein a water tank 84, wherein the water tank 84 and the humidifier 14 are brought into communication via a first circulatory path 86. In the first circulatory path 86, a water circulation pump 88 for supplying water from the water tank 84 to the humidifier 14, a pressure meter 90 for detecting water pressure, and a flow rate meter 92 for detecting a water flow rate are also arranged. The pressure meter 90 and/or the flow rate meter 92 make up a freezing detection means for detecting a frozen state of the water.

The water melting device 18 is made up of a second circulatory route 82, providing communication between the medium introduction port 66 and the medium discharge port 74, for circulating a medium to the inside of the humidifier 14. The second circulatory route 82 is provided with a reserve tank 94, wherein the reserve tank 94, the medium introduction port 66 of the humidifier 14, and the medium discharge port 74 are maintained in communication through a second circulatory path 96. In the second circulatory path 96, there are also arranged a medium circulation pump 98 for supplying the medium from the reserve tank 94 to the humidifier 14, and a heat-exchange device (heating means) 100 for conveying heat to the medium for melting the water, when it is detected that the water is in a frozen state.

As for the medium, in particular, any of the following may be used, wherein the respective melting temperatures, under ordinary pressure are shown in parenthesis: methanol (−97.78° C.), ethanol (−114.5° C.), propanol (−127° C.), isopropanol (−89.5° C.), 1-butanol (−89.53° C.), 2-methyl-1-propanol (−108° C.), 2-butanol (−114.7° C.), 1-hexanol (−44.6° C.), 1-octanol (−14.9° C.), 2-ethyl-hexanol (−76° C.), methane (−182.48° C.), ethane (−183.6° C.), propane (−187.69° C.), ethylene-glycol (−12.6° C.), propylene-glycol (−60° C.), ethyl-ether (−116.3° C.), toluene (−95° C.), ammonia (−77.7° C.), methylamine (−93.46° C.), and ethylamine (−81° C.).

As illustrated in FIG. 1, a fuel cell unit 108 is provided which comprises a solid polymer electrolyte membrane 102 sandwiched between an oppositely facing cathode-side electrode 104 and an anode-side electrode 106, wherein a plurality of such fuel cell units 108 are stacked together, interspaced by non-illustrated separators. The fuel cell 12 is connected to a stack temperature controller 110. The stack temperature controller 110 supplies a temperature adjusting medium to cooling passages (non-illustrated) inside of the fuel cell 12, where, in actuality, the stack temperature controller 110 is constructed similarly to the water melting device 18.

A description of the operation of the humidifying device 10, constructed as indicated above, shall now be given.

As shown in FIG. 2, when a fuel gas (hydrogen) is supplied to the fuel gas introduction port 60 of the humidifier 14, the fuel gas is introduced into the fuel gas passages 34a–34c formed in the side surfaces 32a, 50a and 54a of the first, third and fifth water permeable membranes 22a, 22c and 22e. On the other hand, when an oxygen-containing gas is supplied to the oxygen-containing gas introduction port 62 of the humidifier 14, the oxygen-containing gas is introduced into the oxygen-containing gas passages 48a–48c formed in the side surfaces 38b, 52b and 56b of the second, fourth and sixth water permeable membranes 22b, 22d and 22f.

At this point, as shown in FIG. 4, under operation of the pump 88, water is supplied from the water tank 84 to the water introduction port 64 of the humidifier 14 through the first circulatory path 86. Such water, as shown in FIG. 2, is introduced into the water passages 40a–40f formed in the side surfaces 32b, 38a, 50b, 52a, 54b and 56a of the first through sixth water permeable membranes 22a–22f.

The water introduced in the water passages 40a–40f permeates the first through sixth water permeable membranes 22a–22f, and is supplied to the fuel gas passages 34a–34c and the oxygen containing gas passages 48a–48c, respectively, thereby humidifying the fuel gas and the oxygen-containing gas. Any unused water is discharged into the first circulatory route 86 from the water discharge port 72, and returned to the water tank 84.

Next, a humidified fuel gas is supplied to the interior of the fuel cell 12 from the fuel gas discharge port 68, and further supplied to the anode-side electrode 106 which makes up part of the fuel cell unit 108. On the other hand, a humidified oxygen-containing gas is supplied to the interior of the fuel cell 12 from the oxygen-containing gas discharge port 70, and is further supplied to the cathode-side electrode 104 which makes up part of the fuel cell unit 108. Further, a temperature adjusting medium, adjusted to a predetermined fixed temperature is supplied to the interior of the fuel cell 12 from the stack temperature controller 110, whereby a temperature adjustment operation on the fuel cell unit 108 is performed.

When the fuel cell 12 is employed in regions having cold climates, it is easy for water in the interior of the humidifier 14 to become frozen. To cope with this problem, the current embodiment comprises medium flow passages 44 for supplying a medium having a melting point lower than that of water, such medium flow passages 44 being formed between the second supply plates 24a, 24b in proximity to, yet independently from, the water passages 40a–40f.

Thereby, when water becomes frozen in the water passages 40a–40f, as shown in FIG. 4, the medium is supplied to the medium introduction port 66 of the humidifier 14 from the reserve tank 94, by means of the pump 98. The medium, as a non-frozen medium, follows along the medium flow passages 44 in a winding or serpentine fashion, flowing to the medium discharge port 74, and as a result heat-exchange is conducted across the supply plates 24a, 24b between medium and the frozen water in the water passages 40a–40f which are disposed in proximity to the medium flow passages 44. Thus, the humidifying device 10 achieves the effects of being extremely simple in structure, while enabling a simple and efficient melting operation to be performed on any frozen water in the humidifier 14.

Furthermore, in the first embodiment, if a frozen water condition in the humidifier is generated, as shown in FIG. 4, when a pressure indication (water pressure) detected by the pressure meter 90 disposed in the first circulatory route 80 becomes higher than a fixed value and/or when it is detected by the flow rate meter 92 that the water is in a non-flowing state, it can be automatically detected that the water is currently in a frozen condition.

When this occurs, based on the detection result of the pressure meter 90 and/or the flow rate meter 92, the heat-exchange device 100 arranged in the second circulatory route 82 is operated. As a result, the medium which is supplied to the interior of the humidifier 14 via the second circulatory route is heated by the heat-exchang device 100, wherein the frozen water inside the humidifier 14 can be even more swiftly and reliably melted.

Further, in the first embodiment, although both the fuel gas and the oxygen-containing gas are humidified by the humidifier 14, the invention is not necessarily so limited, and it is also possible to have only one or the other or the fuel and oxygen-containing gases humidified.

Figure 5:
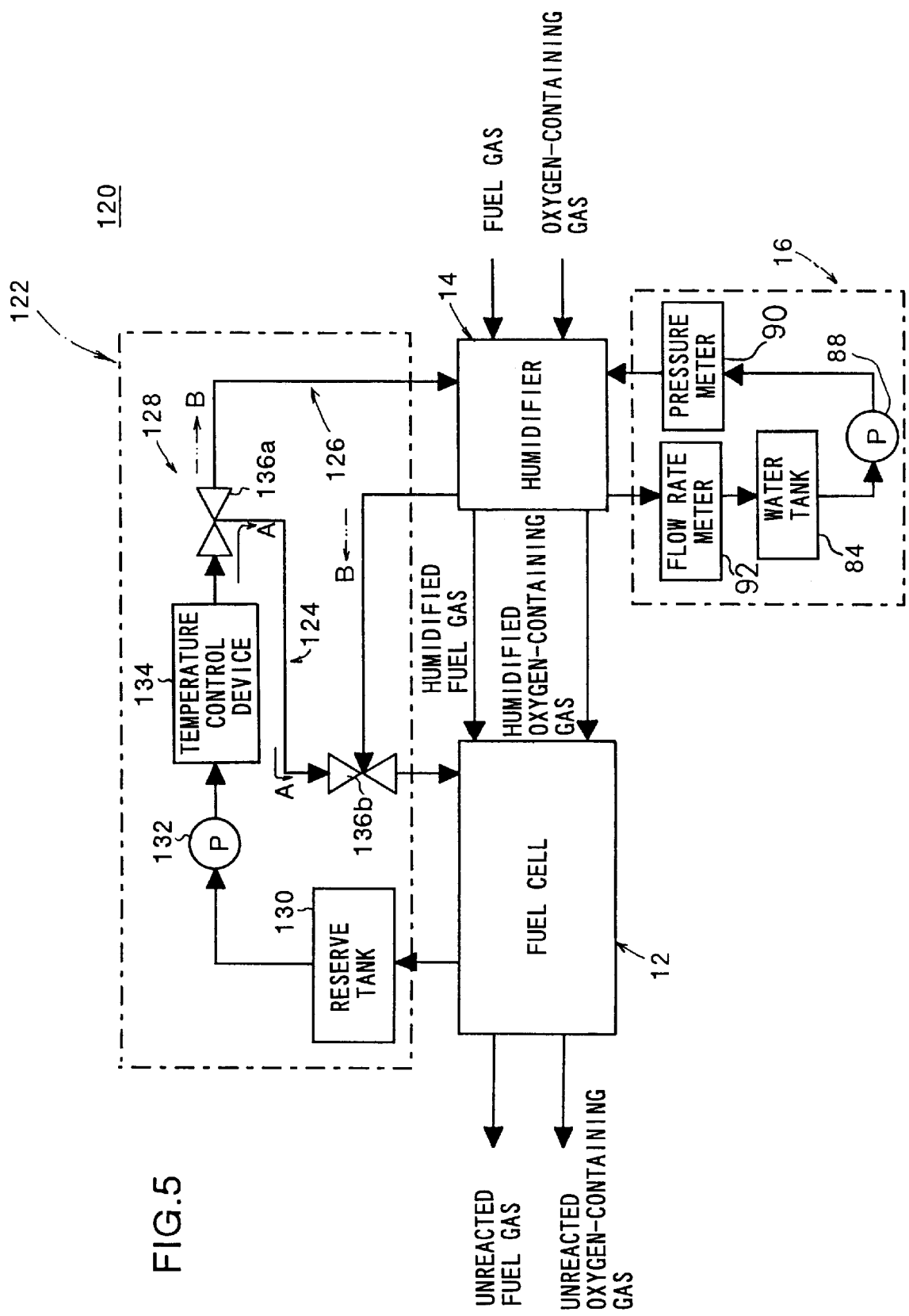
FIG. 5 is an outline structural diagrammatic view of the humidifying device and fuel cell according to a second embodiment of the present invention.

In FIG. 5, structural details of a humidifying device 120 according to a second embodiment of the present invention are shown in outline form. Further, structural features which are the same as found in the humidifying device 10 according to the first embodiment are indicated using like reference numerals, and for the sake of brevity, detailed discussion thereof is omitted.

The humidifying device 120 comprises a humidifier 14, a gas humidity controller 16 and a temperature management controller 122 for melting frozen water inside the humidifier 14, which temperature management controller 122 is interconnected to the fuel cell 12. The temperature management controller 122 is equipped with a first circulatory path 124 by which a medium is supplied to a cooling passage (not shown) in the interior of the fuel cell 12, a second circulatory path 126 by which the medium is circulated through the interior of the humidifier 14, and a switching valve means 128 for both establishing and blocking communication between the first and second circulatory paths 124 and 126.

A medium reserve tank 130, a medium circulating pump 132 and a temperature control device 134, such as a heat exchange device, for adjusting the temperature of the medium are respectively arranged in the first circulatory path 124. The switching valve means 128 is made up of first and second switching valves 136a and 136b arranged respectively in the first circulatory path 124, wherein the second circulatory path 126 is likewise connected to the first and second switching valves 136a and 136b.

With the humidifying device constructed in this manner, humidification of the fuel and oxygen-containing gases is conducted in the humidifier 14 by way of the gas humidity controller 16, and the fuel and oxygen-containing gases which have been humidified are then supplied to the fuel cell 12. In the temperature management controller 122, the medium contained in the reserve tank 130 is supplied, under operation of the pump 132, along the first circulatory path 124 in the direction of the arrows A, and is circulated through non-illustrated cooling passages inside the fuel cell 12.

On the other hand, when a frozen state of the water in the humidifier 14 is generated, the second circulatory path 126 is brought into communication with the first circulatory path 124 by the switching valves 136a, 136b. As a result, the medium in the reserve tank 130 is supplied in the direction of the arrows B, so that first it is introduced into the humidifier 14, and after the frozen water inside the humidifier 14 has been melted, the medium is then supplied to the interior of the fuel cell.

Accordingly, the temperature management controller 122 possesses, in a single unit, the functions of the stack temperature controller 110 and the water melting device 18 of the first embodiment, wherein the structure of the humidifying device is further simplified.

Figure 6:
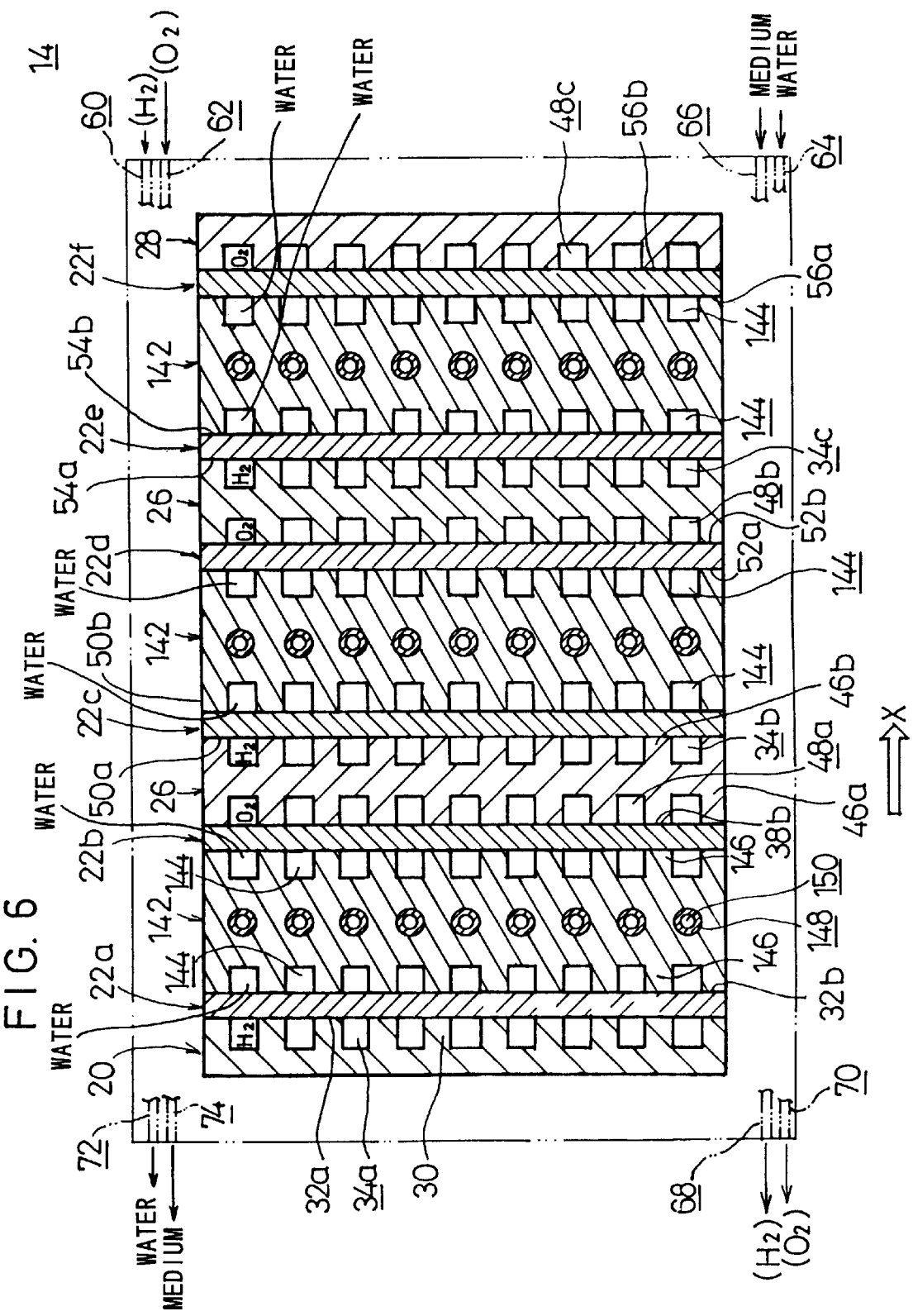
FIG. 6 is an explanatory view of the interior of the humidifier which makes up the humidifying device according to a third embodiment of the present invention.

In FIG. 6, the interior details of a humidifier 140 structured according to a third embodiment of the humidifying device of the present invention are shown in outline form. Further, features which are the same as found in the humidifier 14 of the humidifying device 10 or 120 according to the first embodiment are indicated using like reference numerals, and for the sake of brevity, detailed discussion thereof is omitted.

In the humidifier 140, in place of the two second supply plates 24a, 24b of the humidifier 14, a single second supply plate 142 is provided. On both surfaces of the second supply plate 142, plural projections 146 are disposed, forming perpendicularly directed serpentine humidifying passages 144. In a central portion of the second supply plate 142, parallel to the humidifying water passages 144, a pipe 148 is disposed, wherein a medium flow passage 150 is formed in the control body 148 enabling a low melting point medium to flow therethrough.

Accordingly, when using the humidifier 140, the same effects achieved by the humidifier 14 are attained.

As has been described above, with the humidifying device for use with a fuel cell according to the present invention, when water which is used for humidifying a fuel gas and oxygen-containing gas becomes frozen within the water passages, a medium having a melting point below that of water is supplied to medium flow passages which are disposed in the vicinity of the water passages, thereby instigating heat-exchange between the water and the medium. As a result, the fuel cell retains a simplified structure, together with enabling simple and efficient melting of the humidifying water.

What is claimed is:

1. A gas humidifying device for a fuel cell, in which said humidifying device humidifies a fuel gas and/or an oxygen-containing gas which is supplied to the fuel cell, in which an anode electrode and cathode electrode oppositely face each other with a solid electrolyte membrane interposed therebetween, comprising:

a water permeable element;

a gas supply passage formed on one side surface of said water permeable element;

a humidifying water passage formed on the other side surface of said water permeable element; and a medium flow passage for supplying a medium having a melting point below that of water which is disposed independently from yet proximate to said humidifying water passage.

2. The gas humidifying device according to claim 1, further comprising a circulatory route for circulating said medium to said medium passage, and a heating means disposed in said circulatory route for conveying heat to said medium for melting said water when it is detected that said water has become frozen.

3. The gas humidifying device according to claim 1, further comprising:

a first circulatory path for supplying said medium to a cooling passage in the interior of said fuel cell;

a second circulatory path for circulating said medium to said medium flow passage; and a switching valve for blocking and unblocking communication between said first circulatory path and said second circulatory path.

4. The gas humidifying device according to claim 1, wherein said medium flow passage has a medium therein selected from the group consisting of methanol, ethanol, propanol, isopropanol, 1-butanol, 2-methyl-1-propanol, 2-butanol, 1-hexanol, 1-octanol, 2-ethyl-hexanol, methane, ethane, propane, ethylene-glycol, propylene-glycol, ethyl-ether, toluene, ammonia, methylamine, and ethylamine.

5. A gas humidifying device for humidifying a gas supplied to a fuel cell, comprising:

a water permeable element;

a gas supply passage formed on one side surface of said water permeable element;

a humidifying water passage formed on the other side surface of said water permeable element; and a medium flow passage disposed sufficiently proximate to said humidifying water passage so as to be in heat exchange relationship with said humidifying water passage, said medium flow passage for circulating a medium therethrough having a temperature higher than 0° C.

6. The gas humidifying device according to claim 5, further comprising a circulatory route for circulating said medium through said medium passage, and a heating means disposed in said circulatory route for heating said medium.

7. The gas humidifying device according to claim 5, further comprising:

a first circulatory path for supplying said medium to a cooling passage in the interior of said fuel cell;

a second circulatory path for circulating said medium to said medium flow passage; and a switching valve means for selectively circulating said medium through said first circulatory path and said second circulatory path.

8. A gas humidifying device for humidifying a gas supplied to a fuel cell, comprising:

a water permeable element;

a gas supply passage formed on one side surface of said water permeable element for circulating the gas through;

a humidifying water passage formed on the other side surface of said water permeable element for circulating water through and humidifying the gas by passing through said water permeable element; and means disposed sufficiently proximate to said humidifying water passage so as to be in heat exchange relationship with said humidifying after passage, said means for heating said humidifying water passage when the water is frozen.

* * * * *